United States Patent [19]

Banks

[11] Patent Number: 5,252,108
[45] Date of Patent: Oct. 12, 1993

[54] HYDROPONIC FARMING METHOD AND APPARATUS

[76] Inventor: Colin M. Banks, 1043 Miller Ave., Altamonte Springs, Fla. 32701

[21] Appl. No.: 943,467

[22] Filed: Sep. 10, 1992

Related U.S. Application Data

[63] Continuation of Ser. No. 782,258, Oct. 25, 1991, abandoned, which is a continuation of Ser. No. 521,980, May 10, 1990, abandoned.

[51] Int. Cl.⁵ ............................................. A01G 31/00
[52] U.S. Cl. .......................................... 47/58; 47/62; 47/17; 47/65
[58] Field of Search ...................... 47/58, 62, 17, 65

[56] References Cited

U.S. PATENT DOCUMENTS

| | | | |
|---|---|---|---|
| 3,660,933 | 5/1970 | Wong, Jr. | 47/1.2 |
| 4,028,847 | 6/1977 | Davis et al. | 47/65 |
| 4,037,362 | 7/1977 | Finck | 47/59 |
| 4,118,891 | 10/1978 | Kehl et al. | 47/59 |
| 4,163,342 | 8/1979 | Fogg | 47/65 |
| 4,312,152 | 1/1982 | Drury et al. | 47/63 |
| 4,505,068 | 3/1985 | Kaneko | 47/59 |
| 4,584,791 | 4/1986 | Wolf | 47/62 |
| 4,780,989 | 11/1988 | Mears, et al. | 47/65 |
| 4,973,096 | 12/1988 | Todd | 47/62 |

Primary Examiner—Henry E. Raduazo
Attorney, Agent, or Firm—Warren L. Franz

[57] ABSTRACT

A hydroponic farming system has seed germination, seedling growth, plant picking, cool storage/shipping and equipment cleaning areas arranged to follow the flow of the plant processing cycle. Plants are started from blocks of seed cubes arranged on wheeled trolley germination tables having tiered and sloped top surfaces across which water and nutrient solution are flowed from headers supplied successively by spaced overhead lines, to collection channels discharged to subsurface returns The cubes of sprouted seedlings are then separate and transferred to wheeled trolley growing tables, where nutrient from overhead lines is distributed from lateral weirs, through longitudinal inclined trays, and lateral footers to subsurface returns. The trays of the growing tables have central depressions and include covers with downwardly extending flanges to prevent spraying of the tray sides.

19 Claims, 4 Drawing Sheets

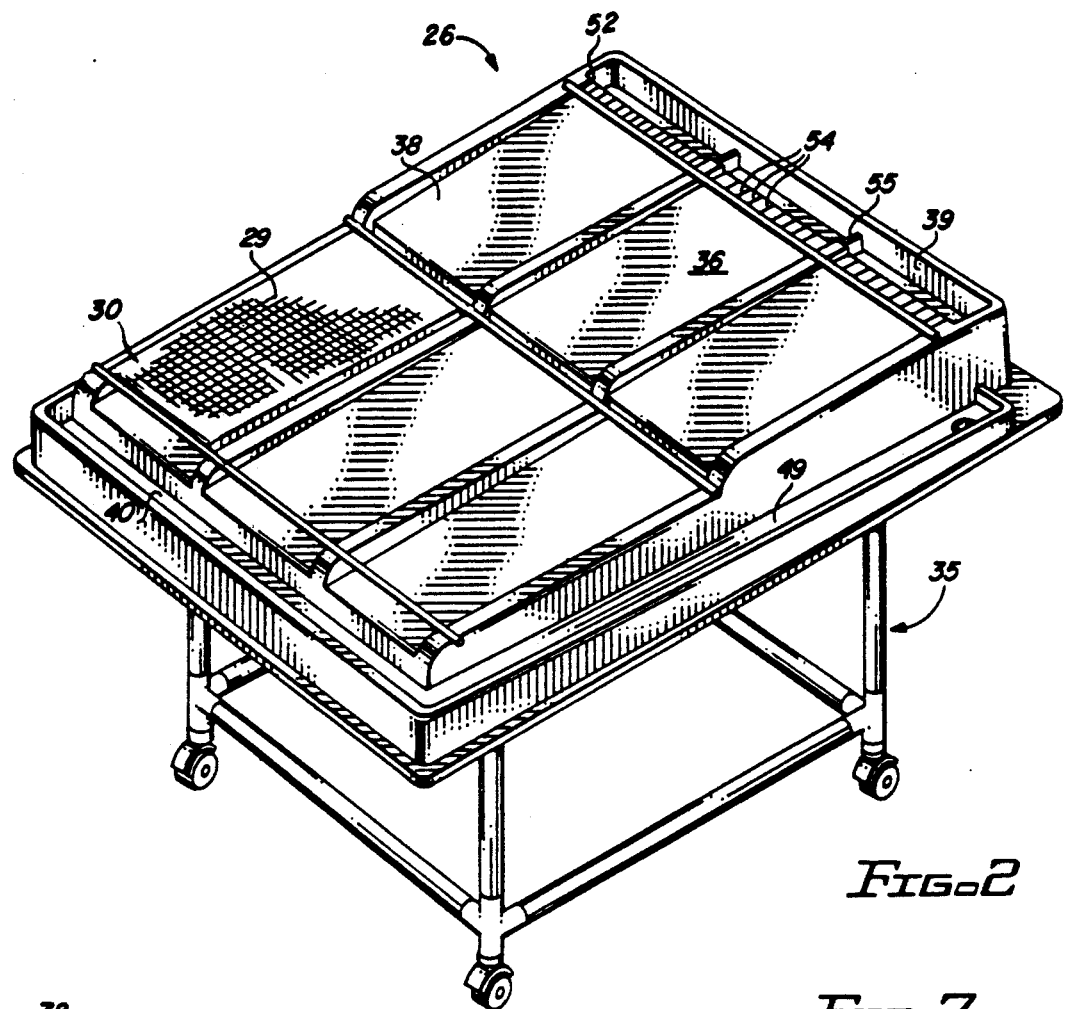
FIG. 2
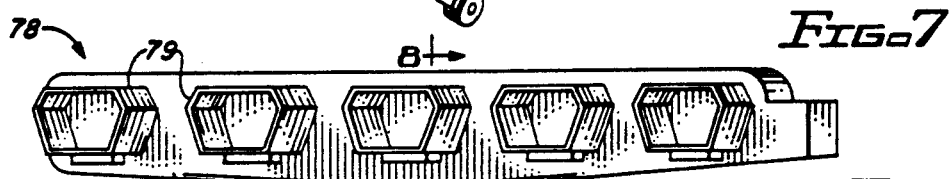
FIG. 7
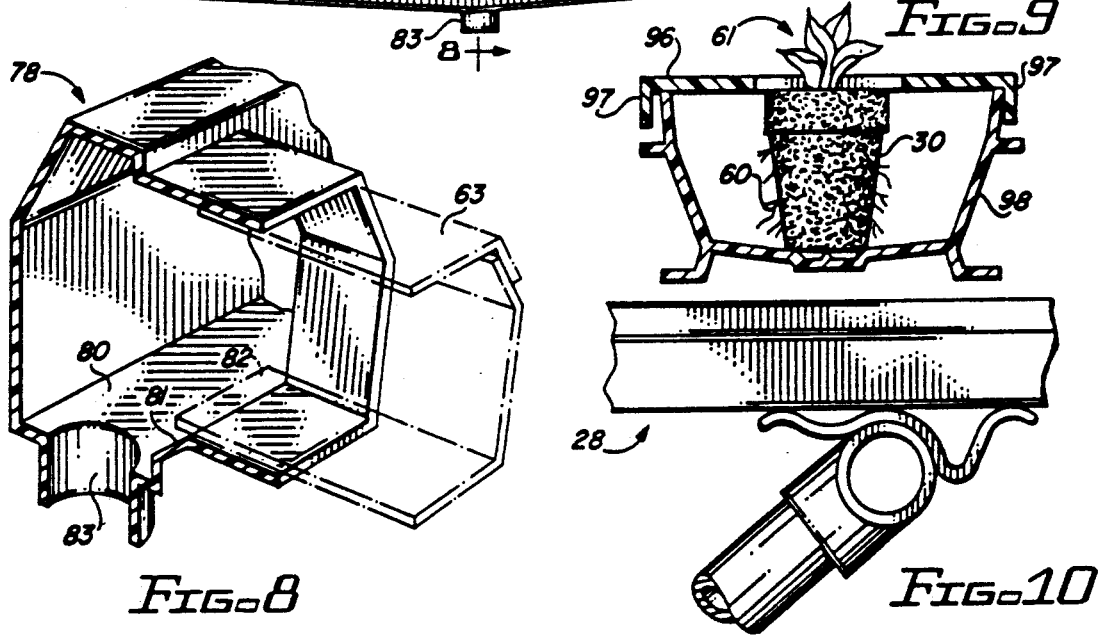
FIG. 9
FIG. 8
FIG. 10

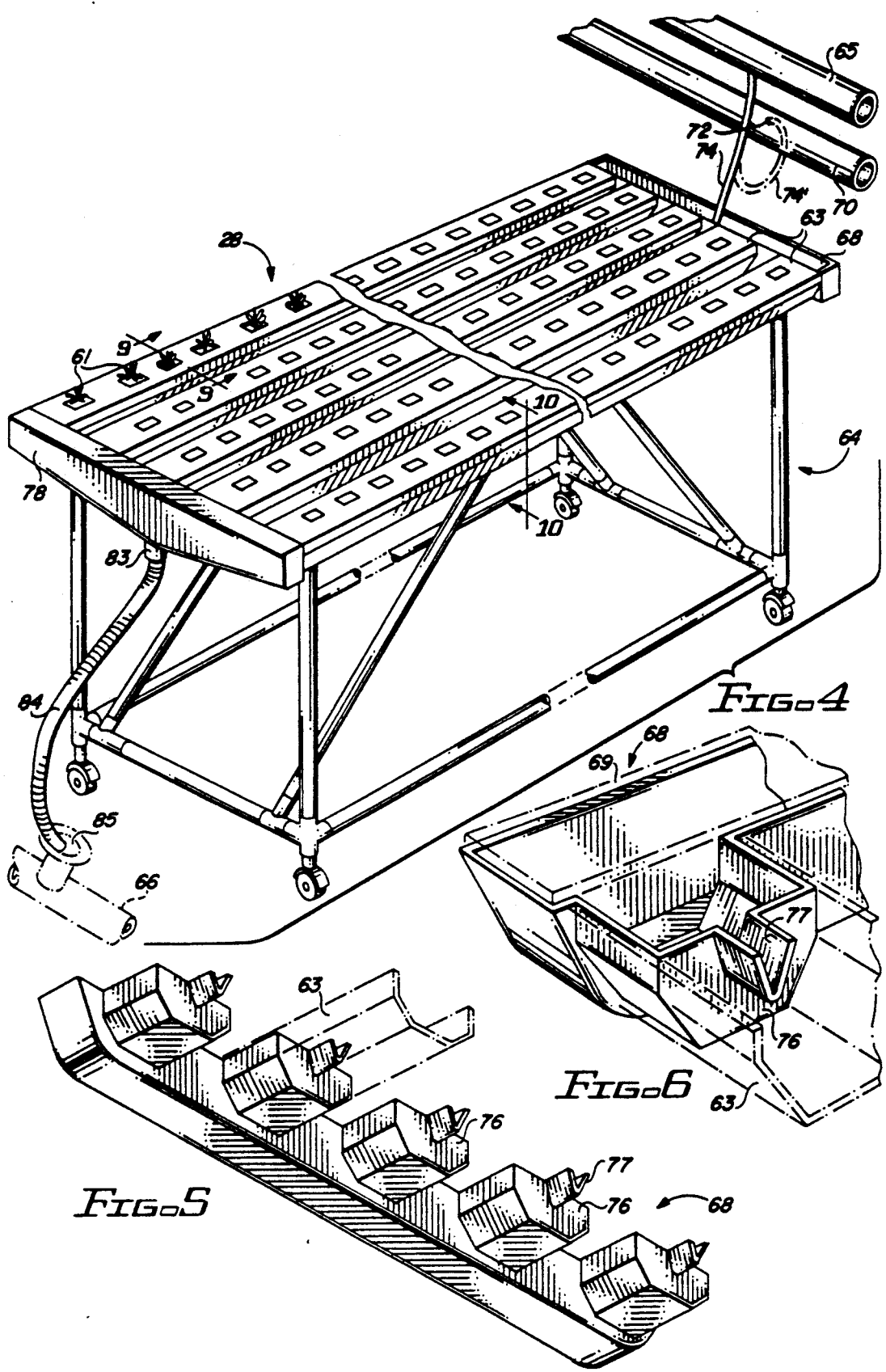

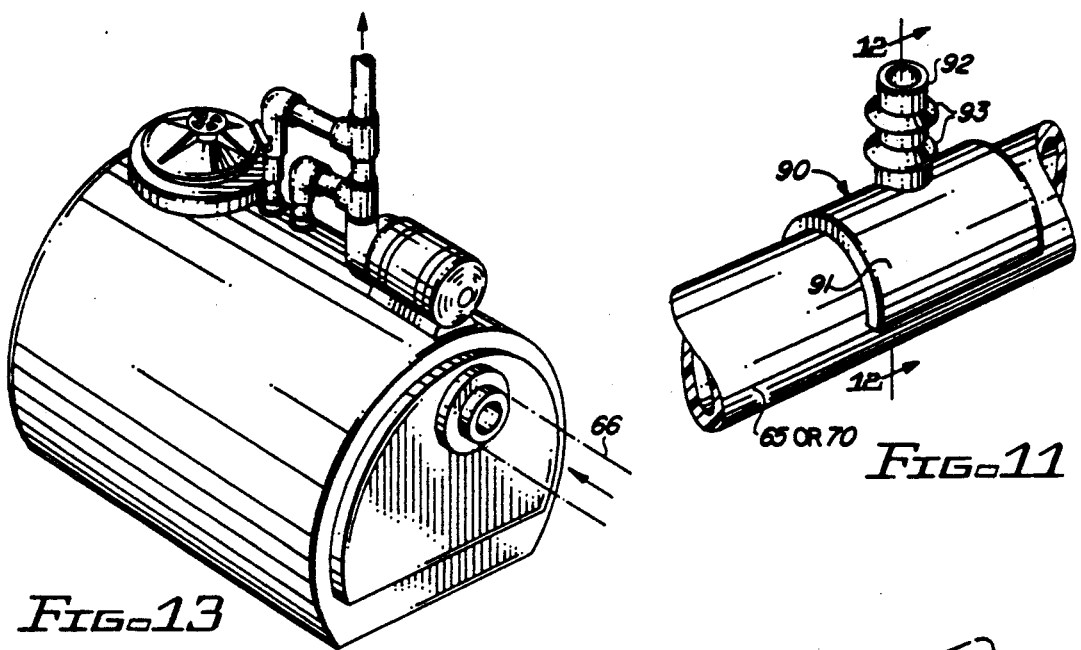
FIG. 13
FIG. 11
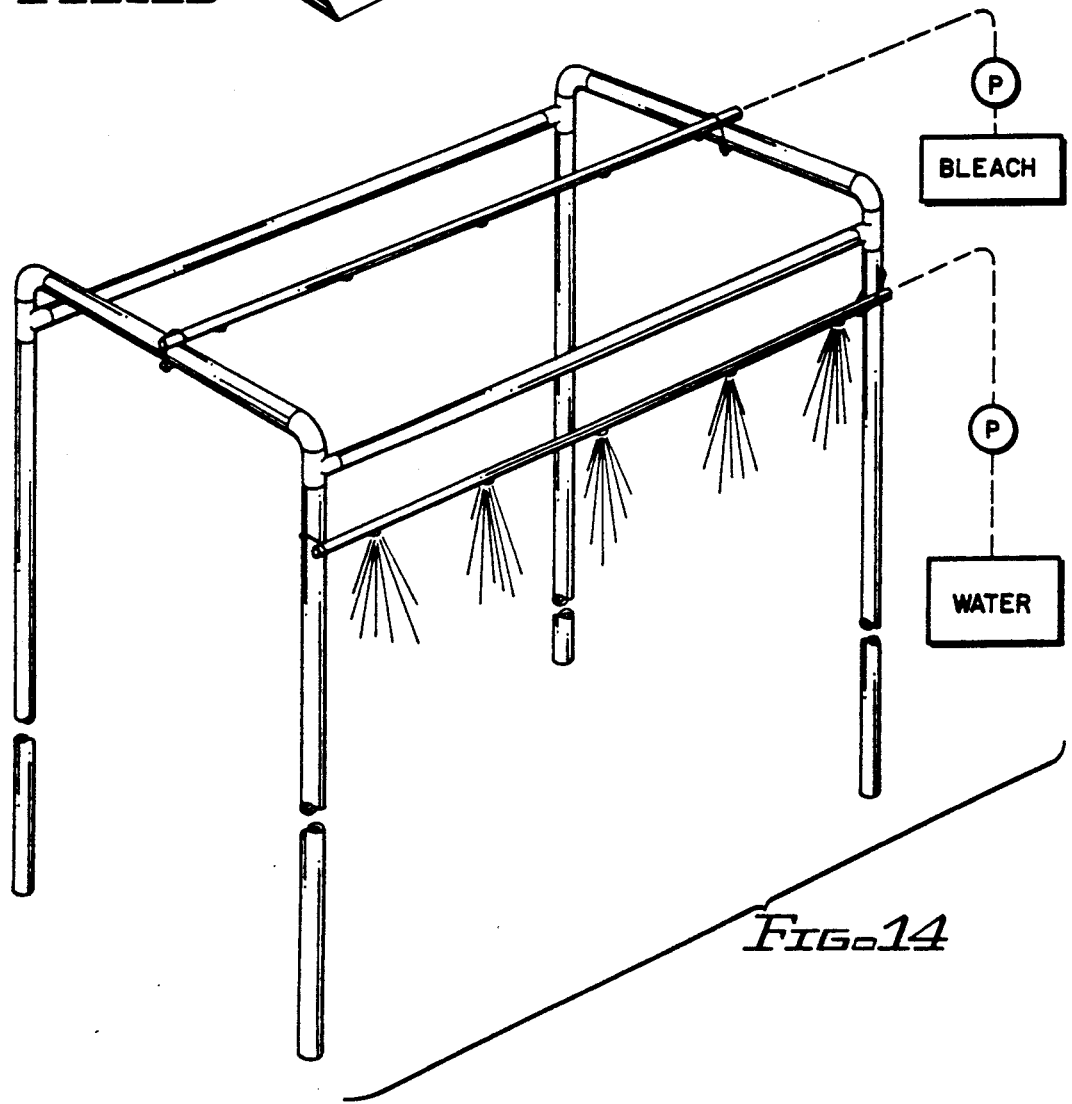
FIG. 14

HYDROPONIC FARMING METHOD AND APPARATUS

This is a continuation of co-pending U.S. patent application Ser. No. 07/782,258, filed Oct. 25, 1991, now abandoned, which is a continuation of U.S. patent application Ser. No. 07/521,980, filed May 10, 1990, now abandoned.

BACKGROUND OF THE INVENTION

This invention relates to soilless plant growing in general; and, in particular, to a systems approach to hydroponic farming of plants such as lettuce, that greatly minimizes plant handling, improves nutrient flow, facilitates cleaning, and reduces workplace clutter.

In hydroponic farming, plants are grown without soil by supplying them with nutrients and water through conduits to enhance and promote plant growth under controlled environmental conditions.

The hydroponic farming process of some lettuce plants, for example, encompasses a 40-day growth cycle from seed planting to harvest, including three stages: a first, germination stage in which seeds are soaked in 100% water; a second, seedling stage in which the sprouting plants are supplied with a 20% nutrient/80% water solution; and a third, maturing plant growth stage in which 100% nutrient solution is supplied until the plants are fully grown. In a typical conventional operation, the plants are handled one or more times at each stage, while they are transferred from tray to tray and location to location. The usual conventional approach does not move the plants, or locate the equipment in an efficient way according to the succession of growth stages and handling steps involved. Equipment arrangements are cluttered and difficult to clean. Nutrient lines are left exposed to light which promotes undesired algae growth, and hoses have small openings that become readily clogged, so entire rows of plants can be lost at one time. Nutrient is also fed to the hoses in an uneven manner, so that hoses have different pressures and unused hoses can pop off, causing spillage. Also, conventional plant growth trays are poorly configured, so sides sag and spread, causing nutrient flow to miss plants.

SUMMARY OF THE INVENTION

The invention provides an improved, systems approach to soilless hydroponic farming that minimizes plant handling, improves nutrient flow, facilitates cleaning, and reduces workplace clutter.

In one aspect of the invention, hydroponic farm facilities are laid out so adjacent areas correspond to successive steps in the cultivation process, and the last step is adjacent to the first. Plants are started from rock wool cubes in densely packed arrangements, on germination tables in a germination area. After the seedlings have sprouted, the cubes are separated and plants are transferred to less densely packed, growing tables in a growing area. When fully grown, the plants are then moved with the growing tables to a picking area, which is adjacent to cool storage and shipping areas and also adjacent to a table cleaning area. The cleaning area is near the germination area, so that once the plants have been picked and the growing tables cleaned, the tables are ready to receive fresh batches of seedlings from the germination area. Upon transfer of the seedlings to the growing tables, the germination tables are then also adjacent the cleaning area and are cleaned prior to receiving fresh seed clusters.

In a second aspect of the invention, the invention makes use of overhead nutrient supply lines and subterranean unused nutrient return lines, to provide a clutter-free, closed liquid flow system. To keep the pressure of the nutrient delivery system constant, an overhead, unused nutrient return line is provided parallel to the supply line, into which distribution hoses of the overhead supply line can be discharged when they are not in use. In the growth area, nutrient is delivered at both ends of the nutrient supply line, so that flow to all growing tables from any distribution hose will be generally the same.

In a preferred embodiment, discussed below, the germination tables take the form of wheeled trolleys having tiered and sloped top surfaces for flowing delivered liquids from a header channel, past the seeds, to a collection channel, and then back below the top surface for discharge to a runoff conduit. The tables are configured to accommodate two stages of the growth cycle in the same vicinity, without the need to transfer the plants. Two nutrient supply lines, one with 100% water and the other with 20% nutrient/80% water are run parallel to each other in adjacent, spaced positions. The germination tables are first positioned to supply the plants with the 100% water, then the tables are shifted slightly to place them in position to receive the 20% nutrient solution.

The growing tables and 100% nutrient supply and return conduits are configured for improved nutrient flow, and to discourage algae growth. In a preferred embodiment, discussed below, each growing table takes the form of a wheeled trolley holding a plurality of inclined trays, laterally spaced in side-by-side relationship. A weir or header extends laterally at upstream inlet ends of the trays to supply nutrient through a hose from the overhead nutrient supply line. A footer extends laterally at the downstream outlet ends of the trays to receive unused nutrient and deliver the same by a hose to an entry port of a subsurface return line. The trays have central depressions and include a cover with downwardly extending, opposite flanges that prevent lateral spreading of the tray sides.

BRIEF DESCRIPTION OF THE DRAWINGS

Embodiments of the invention have been chosen for purposes of description and illustration, and are shown in the accompanying drawings, wherein:

FIG. 2 is a perspective view of a seed germination table usable in the system of FIG. 1;

FIG. 3 is a schematic side view, helpful in understanding the operation of the table of FIG. 2;

FIG. 4 is a perspective view of a growing table usable in the system of FIG. 1;

FIG. 5 is a perspective view of the header weir of the table of FIG. 4;

FIG. 6 is an enlarged, fragmentary view of the header of FIG. 5;

FIG. 7 is a perspective new of the footer of the table of FIG. 4;

FIG. 8 is an enlarged, fragmentary section view taken along the line 8—8 of FIG. 7;

FIG. 9 is an enlarged section view of a tray taken along the line 9—9 of FIG. 4;

FIG. 10 is an enlarged fragmentary side view as seen looking along taken along line 10—10 of FIG. 4;

FIG. 11 is a fragmentary perspective view showing the manner of hose attachment to a nutrient supply line;

FIG. 12 is a section view taken along the line 12—12 of FIG. 11;

FIG. 13 is a perspective view of an underground nutrient supply tank usable in the embodiment of FIG. 1; and FIG. 14 is a perspective view of apparatus usable for table cleaning.

Throughout the drawings, like elements are referred to by like numerals.

DETAILED DESCRIPTION OF PREFERRED EMBODIMENTS

Figure 1:
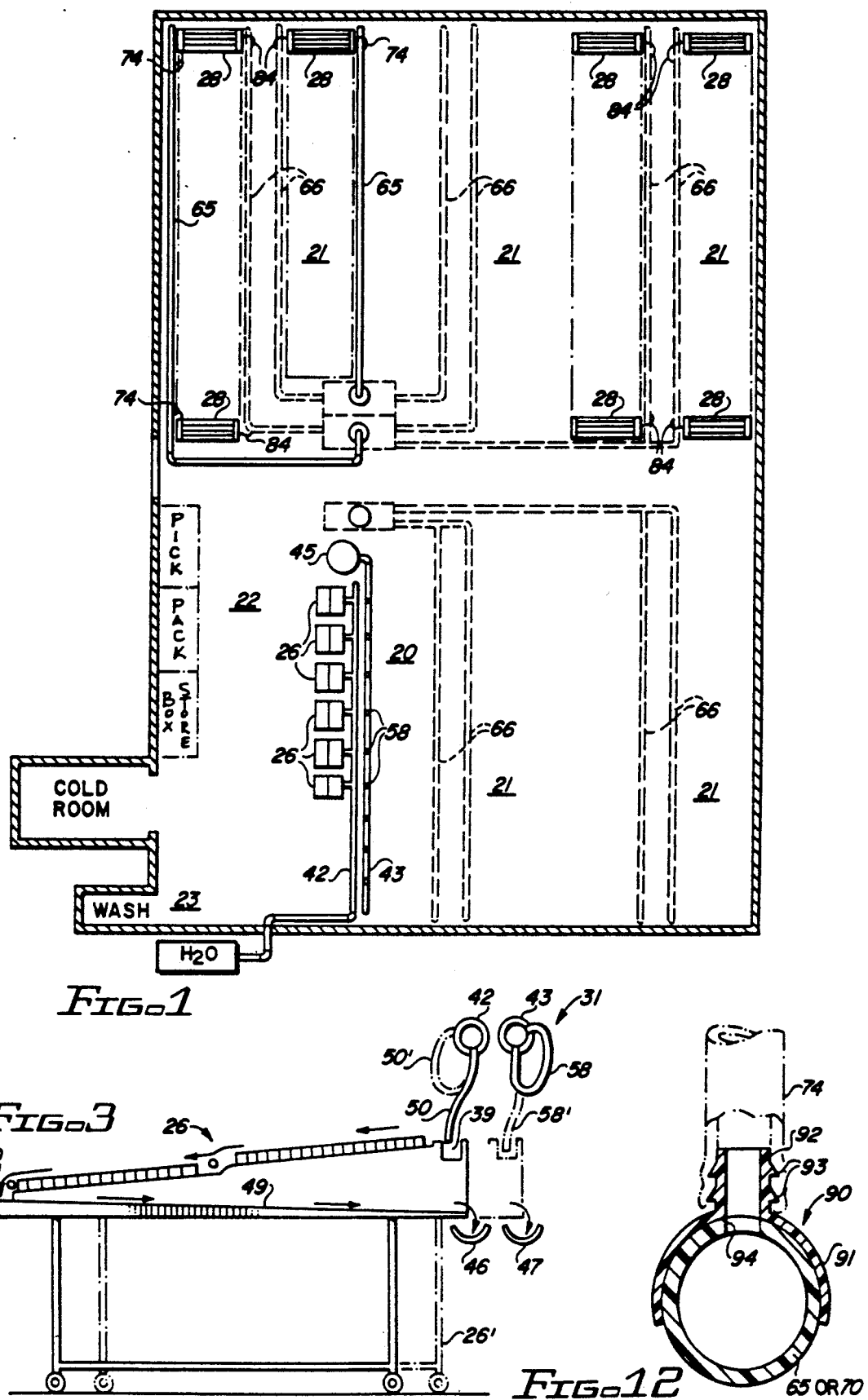
FIG. 1 is a floorplan layout of an exemplary embodiment of a hydroponic farming system in accordance with the principles of the method and apparatus of the present invention.

FIG. 1 shows an exemplary floorplan layout for the workplace of a hydroponic farming system for the soilless growth of lettuce plants in accordance with the principles of the invention The workplace is divided generally into areas or stations 20, 21, 22 and 23 for the efficient flow of plants and the equipment according to the steps in the hydroponic farming process. Area station 20 is the seed germination area and corresponds to the physical location where seeds are planted and processed through their seedling stage. A plurality of seed germination tables 26 are located at station 20. Station 21 is the plant growth area and corresponds to the physical location at which seedlings taken from the germination area are further nurtured until full grown. FIG. 1 shows a plurality of growing tables 28 located at station 21. Station 22 is the plant picking area and corresponds to the location where fully grown plants taken from the growth area 21 are picked, packed, and placed in cold storage until being shipped to customers. Station 24 is the wash area at which the tables 26, 28 from the germination area 20 and growth area 21 are washed for reuse after their respective seedlings and mature plants are unloaded. Seed growth is started at station 20. Unlike with conventional processes, both germination and seedling growth stages (100% water and 20% nutrient) are performed without transplanting, with the plants remaining on the same germination tables 26. Plants are then moved to growing tables 28 and taken to area 21. Novel growing table and nutrient conduit arrangements, described further below reduce clutter, provide better nutrient flow and pressure, and reduce algae and clogging. When growth is complete, tables 28 are taken to the picking area 22, then cleaned in wash area 23. This positions the growing tables 28, after cleaning, right next to the germination station 20 to receive new seedlings from the tables 26.

Seeds for lettuce plants are commercially available in 20"×10" blocks 29 of 1"×1"×1 ¼" cubes 30 (FIGS. 2 and 9) of fibrous rockwool material, providing 200 seeds per block 29. The seeds are first supplied with 100% water for one week, then supplied with a 20% nutrient/80% water solution. In the prior art, the cubes are cut and plants moved between the 100% water and 20% nutrient solution stages. They fall all over and are difficult to control. The system of the invention uses germination tables 26 and conduit system 31, shown in FIGS. 2 and 3.

Germination tables 26 are sized to hold six 200-seed rockwool cube units 29, for a total per table of 1200 plants per table in two rows of three units each, as shown. The tables 26 are supported on a wheelable support structure 35. A top surface 36 of the table has flat, angled tiers 38, inclined downwardly for flow of liquid by action of gravity from a header channel or weir 39 along the stepped tabletop 36 (over the units 29) to a runoff channel 40. The tables 26 are located in area 20, so that two supply pipes 42, 43 run laterally, in adjacent spaced apart positions, overhead at the header channel end of the tables (see FIGS. 1 and 3). The pipe 42 is connected to the water main and carries 100% water. The second pipe 43 is connected to a nutrient solution supply tank and pump 45 (FIG. 1) and carries 80% water/20% nutrient solution. Below each pipe is a runoff trough or pipe 46, 47 (FIG. 3), corresponding to the overhead pipe 42, 43, respectively, carrying off the 100% water runoff or 80% water/20% nutrient solution runoff after passage over the table. On each table 26, fluid is directed back below the top surface, from the runoff channel 40 back along an inclined longitudinal runoff path 49 to a discharge point to flow into the one or the other of the runoff troughs 46, 47. The seed blocks 29 are placed on the clean germinating tables 26. The tables 26 are positioned in area 20, with their header channels 39 initially located below the 100% water line 42. A hose 50 (FIG. 3) is connected to deliver water from the overhead water line 42 to fill the header channel 39 with water. When the water overflows the partition plate 52, it travels down the incline of the surface 36, over the blocks 29, to the runoff channel 40, and back again below the top surface 36 along the runoff 49, to discharge into the water return line 46. Ten longitudinal grooves 54 provided in laterally-spaced positions along the plate 52 corresponding to each cube row location, assist in providing a uniform flow. Baffles 55, of height less than the height of plates 52, divide the channel 39 into sections, and help the flow.

When it is time to move to the seedling growth stage, the water hose 50 is disconnected (such as by hooking the hose 50 back into the line, as shown by the dot-dash position 50' in FIG. 3), and the tables 26 are rolled back to the dot-dash position 26' underneath the 80/20 nutrient solution line 43. The hose 58 is then moved from its solid line position to its dot-dash position 58', to supply nutrient solution from the line 43 to the weir 39 for flowing over the same path but, this time, back to the nutrient runoff pipe 47. What used to require breaking the plant block units 29 up into cubes 30 and moving them to another location, is done using tables 26, merely by rolling the tables 26 back a short distance to change the conduit from which the fluid is supplied and to which it is discharged.

When roots 60 have sprouted sufficiently, the plants 61 are transferred to the growing tables 28. In the layout of the system of FIG. 1, growing tables 28 whose mature crop has just been picked in area 23 are rolled to wash area 24, where they are sprayed with a shot of bleach to kill algae, rinsed, and then are already directly in position next to the germination tables 26 in area 20 to receive the newly sprouted seedlings. A typical cube 30 with seedling plant 61 is shown in FIG. 9.

In preparation for the final growth stage, the 200-plant rockwool cube units 29 are split up into individual cubes 30 and planted in growing trays or troughs 63 of growing tables 28. The trays 63 are arranged longitudinally, in side-by-side parallel arrays on wheelable support structure 64 to extend between a first end fed by 100% nutrient solution from an overhead nutrient pipe 65, to a second end which discharges into a subsurface nutrient runoff channel 66 (see FIGS. 1 and 4).

The locations of the nutrient supply pipe 65 and the nutrient runoff channel 66 are such that, when the tables 28 are rolled from the area 21, the floor of area 21 is left completely unobstructed. This is in contrast to conventional growing trays which are moved for picking by sliding them off tables which remain in the growing area, leaving the clutter of the tables and floor area-located supply and runoff pipes. Also, in conventional systems, when trays are moved, the hoses which connect the nutrient supply pipe to the trays are put back into the supply line at an aperture or clamped. This varies the flow to other trays by changing the pressure through remaining hoses. The pressure build-up in clamped hoses may cause the hoses to come loose at their connection to the supply pipe, thereby spilling nutrient in the work area. Furthermore, in a typical conventional setup, small diameter hoses are used for feeding nutrient one per tray. Such small hoses are subject to clogging. If clogging occurs, a whole tray of plants may become lost. Because of the 100% nutrient solution at this growth stage, algae buildup is a problem. The runoff channels in conventional setups are frequently left open to light, which encourages algae growth.

In contrast, the growing table 28 takes the form of an inclined trolley on wheels. The illustrated table 28 (FIG. 4) has five trays 63 inclined longitudinally at a slope of 1" drop in 12'. Extending laterally across at the top of the table is a weir or header 68, shown in greater detail in FIGS. 5 and 6, which may be enclosed with a cover 69 (shown in dot-dashed lines in FIG. 6). Supply pipe 65 extends parallel to the weir 68 and in elevated position above the workspace. However, advantageously, a second nutrient return line pipe 70 (FIG. 4) also extends parallel to and above (though slightly below the pipe 65) the weir 68. The line 70 includes apertures 72, so that a hose 74, normally connecting the overhead nutrient supply line 65 with an opening in the top of the weir, can be removed and inserted into the aperture 72 when not in use. This eliminates the need for clamping and maintains the same pressure in all other hoses. The line 70 can be discharged into the line 66. The weir 18 is otherwise closed to prevent algae. As indicated in FIGS. 5 and 6, the ends of the five trays connect to the weir 68 at projections 76, so that when nutrient reaches a certain height in the weir, it spills over into the elevated ends of the trays 63 through the V-shaped channels 77.

When a table 28 is moved, the hose 74 is moved from a position connecting to the weir, to a position connecting to an aperture in the overhead nutrient return line 70 (see dot-dash position 74' in FIG. 4). This has the mentioned advantage over conventional arrangements that put the end of a hose back into the supply line. If an unused hose is put back into the supply line, flow pressure to other trays increases and hoses may pop off. With the return line 70 arrangement, flow to each hose 74 remains the same. Weir 68 also has the advantage over conventional setups that a single hose 74 is used to feed five trays instead of one hose being used for one tray. Thus, hose inside diameter can be larger and is, thus, less apt to clog.

At the other end of table (FIG. 4), a footer weir 78 serves as a closed-to-light collection point for nutrient runoff. Details of the footer 78 are shown in FIGS. 7 and 8. The footer 78 has five, laterally-spaced sleeves 79 contoured to snugly enclose the outlet ends of the five trays 63 received therein. The sleeves 79 are elevated above the footer 78 and bottom 80 and include ramps 81 (FIG. 8). Terminal ends 82 of the trays 63 are positioned downstream of the start of ramps 81, and formed with a downwardly-sloped lip to keep discharged nutrient from coming back into the trays. The weir is sloped towards a central discharge port 83. Nutrient passes from the discharge hose 84 (FIG. 4) from port 83 to the subsurface nutrient discharge return line 66 through an opening 85 in the floor. In this manner, algae on tables is controlled and when tables are rolled away for picking, the work area is completely unobstructed.

FIGS. 11 and 12 illustrate a convenient coupling element 90 which may be used to connect hoses to the conduit lines, such as hoses 74 to the conduit lines 65 or 70. The element comprises a resiliently deformable, arcuate, saddle portion 91 from the center of which projects a vertical tube portion 92 which includes ribs 93. The element 90 is brought over the pipe, with the opening of portion 92 brought into alignment with hole 94 drilled at a location on the pipe 65 or 70. The end of hose 94 may then be slid over the portion 12, where it is releasably secured by stretching over the ribs 93. If desired, adhesive can be added between the saddle portion 91 and the outside of pipe 65 or 70.

FIG. 9 shows the cross-section of a preferred tray 38. Conventional trays have unconnected upper ends of inclined sides and central projections which make it possible to divert nutrient flow in the tray flow channel away from the centerline, so that nutrient misses a plant altogether. Tops of conventional trays are often just laid over the walls to rest on them. This leaves the sides of the tray unsupported, permitting sagging or spreading. With the illustrated cross-section in FIG. 9, the center of the tray is its lowest elevation and there are no partitions that prevent nutrient from gathering at the center. Moreover, the top 96 has opposing downwardly-directed lips or flanges 97 that fit on the outside of the top edges of the tray bottoms 98. This girdles the sides of the trays and keeps them spreading.

Finally, piping of nutrient is arranged so that the overhead lines 65 that run at the heads of the growing tables 28 are fed with nutrient from both ends. This evens the pressure in the supply line 65 for distribution to the hoses 74 that feed the trays 63. Under conventional systems, nutrient is fed from one end only. That means the tray hose nearest that end has the highest pressure, and the last tray hose has the lowest pressure. By feeding from both ends, and hooking unused hoses to the nutrient return 70, pressure flow from each hose 74 is constant and generally equal.

Those skilled in the art to which the invention relates will appreciate that other substitutions and modifications can be made to the described embodiment without departing from the spirit and scope of the invention as described by the claims below.

What is claimed is:

1. A method for hydroponically farming plants, from seed germination through harvesting, in farm facilities providing a soilless environment, said method comprising:
   a) placing blocks of cubes of fibrous material, respectively containing seeds of said plants, onto inclined surfaces of movable germination tables;
   b) locating said germination tables in a seed germination area of said facilities, and flowing water from a first conduit along said inclined surfaces past said blocks, for a germination stage of a first number of days;

c) flowing nutrient solution from a second conduit along said inclined surfaces past said blocks, for a seedling growth stage of a second number of days following said germination stage;

d) removing said blocks from said germination tables, splitting said blocks into individual cubes, and placing said cubes into inclined channels of movable growing tables, said tables having means for shielding said channels from light;

e) locating said growing tables in a plant growth area of said facilities, and flowing nutrient from a third conduit along said inclined channels past said cubes, for a plant growth stage of a third number of days following said seedling growth stage; and f) picking said plants after said plant growth stage.

2. A method as in claim 1, further comprising:
locating said germination tables in a wash area of said facilities following step d), and washing said germination tables in said wash area; and
following said washing step, repeating steps a), b) and c).

3. A method as in claim 2, wherein said seed germination area is located adjacent to said plant growth area and also adjacent to said wash area.

4. A method as in claim 2, further comprising:
locating said growing tables in said wash area following step f), and washing said growing tables in said wash area; and
following said growing table washing step, repeating steps d), e) and f).

5. A method as in claim 4, wherein step f) comprises locating said growing tables in a picking area of said facilities for picking said plants; said seed germination area is located adjacent to said plant growth area; and said picking area is located adjacent to said wash area.

6. A method as in claim 5, further comprising:
packing said plants after picking, and placing said packed plants in a cool storage area of said facilities located adjacent to said picking area.

7. A method as in claim 6, further comprising:
shipping said stored plants to customers from a shipping area of said facilities located adjacent to said cool storage area.

8. A method as in claim 1, wherein said first and second conduits are located in adjacent, spaced apart positions in said seed germination area; said germination tables have header and runoff ends; and said germination tables are located in positions with said header ends proximate said first conduit for step b), then shifted to positions with said header ends proximate said second conduit for step c).

9. A method as in claim 8, wherein said germination tables comprise wheeled trolleys having header channels at said header ends and runoff channels at said runoff ends, and said inclined surfaces comprise flat, angled surfaces arranged in tiers between said header channels and said runoff channels; and said first and second conduits comprise overhead supply pipes.

10. A method as in claim 9, wherein runoff conduits are located in said seed germination area, and steps b) and c) further comprise respectively flowing runoff of said water and nutrient solution to said runoff conduits after passage past said blocks.

11. A method as in claim 1, wherein said third conduit is an overhead nutrient pipe located in said plant growth area; said plant growth area further includes a subsurface nutrient runoff conduit; and step e) comprises flowing nutrient from said nutrient pipe, through said growing table channels, to said nutrient runoff conduit.

12. A method as in claim 11, wherein said nutrient pipe and nutrient runoff conduit are located so that, when said growing tables are moved out of said plant growth area, said nutrient pipe and nutrient runoff conduit do not obstruct the floor of said plant growth area.

13. A method as in claim 11, wherein said nutrient pipe has opposite ends, and step e) comprises flowing nutrient from a source to said growing tables through both said opposite ends.

14. A method as in claim 11, wherein said growing tables comprise wheeled trolleys having header and footer ends, laterally-extending headers at said header ends, laterally-extending footers at said footer ends, and inclined trays, laterally spaced in side-by-side relationship, extending longitudinally between said headers and said footers and defining said channels; and step e) comprises locating said growing tables in said plant growth area with said headers proximate said nutrient pipe, connecting first hoses to supply nutrient from said nutrient pipe to said headers, and connecting second hoses to discharge nutrient runoff from said footers to said runoff conduit.

15. A method as in claim 14, wherein a nutrient return line is provided proximate said overhead nutrient pipe in said plant growth area, and said method further comprises connecting said first hoses to flow nutrient from said nutrient pipe to said nutrient return line, when said first hoses are not connected to said headers.

16. A method for hydroponically farming plants, from seed germination through harvesting, in farm facilities providing a soilless environment, said method comprising:

a) placing blocks of cubes of fibrous material, respectively containing seeds of said plants, onto inclined surfaces of movable germination tables having header and runoff ends;

b) locating said germination tables in a seed germination area of said facilities with said header ends proximate a first overhead conduit, and flowing water from said first conduit, along said inclined surfaces past said blocks, from said header ends to said runoff ends, for a germination stage of a first number of days;

c) shifting said germination tables in said seed germination area to position said header ends proximate a second overhead conduit located in adjacent, spaced-apart relationship to said first conduit, and flowing nutrient solution from said second conduit along said inclined surfaces past said blocks, from said header ends to said runoff ends, for a seedling growth stage of a second number of days following said germination stage;

d) removing said blocks from said germination tables, splitting said blocks into individual cubes, and placing said cubes into inclined channels of movable growing tables having header and footer ends, and including means for shielding said channels from light;

e) locating said growing tables in a plant growth area of said facilities with said growing table header ends proximate a third overhead conduit, and flowing nutrient from said third conduit along said inclined channels past said cubes, from said growing table header ends to said footer ends, for a plant growth stage of a third number of days following said seedling growth stage; and f) locating said growing tables in a picking area of said facilities, and picking said plants after said plant growth stage.

17. A method as in claim 16, further comprising:

locating said germination tables in a wash area of said facilities following step d), and washing said germination tables in said wash area;

following said germination table washing step, repeating steps a), b) and c);

locating said growing tables in said wash area following step f), and washing said growing tables in said wash area; and following said growing table washing step, repeating steps d), e) and f);

said seed germination area being located adjacent to said plant growth area; and said wash area being located adjacent to said picking area.

18. A method as in claim 17, wherein runoff conduits are located in said seed germination area, and a subsurface nutrient runoff conduit is located in said plant growth area; steps b) and c) further comprise respectively flowing runoff of said water and nutrient solution from said runoff ends to said runoff conduits; and step e) further comprises flowing runoff of said nutrient from said footer ends to said nutrient runoff conduit.

19. A method as in claim 18, wherein said growing tables comprise inclined trays, laterally spaced in side-by-side relationship, extending longitudinally between said header and footer ends, said trays having cross-sections with centers at lowest elevations and inclined sides; and step d) further comprises fitting tops with opposing downwardly-directed lips on outside top edges of said inclined sides to keep said sides from spreading.

* * * * *